US007397342B2

(12) United States Patent
Mullet et al.

(10) Patent No.: US 7,397,342 B2
(45) Date of Patent: Jul. 8, 2008

(54) OPERATING SYSTEM FOR A MOTORIZED BARRIER OPERATOR WITH A RADIO FREQUENCY ENERGIZED LIGHT KIT AND/OR SWITCH AND METHODS FOR PROGRAMMING THE SAME

(75) Inventors: Willis J. Mullet, Gulf Breeze, FL (US); Yan Rodriguez, Canton, OH (US); Paul Vandrunen, Navarre, FL (US); Steven Maurer, Pensacola, FL (US); Richard E. Gagnon, Pensacola, FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 59 days.

(21) Appl. No.: 10/782,558

(22) Filed: Feb. 19, 2004

(65) Prior Publication Data

US 2005/0184854 A1 Aug. 25, 2005

(51) Int. Cl.
*G05B 19/00* (2006.01)

(52) U.S. Cl. .................... 340/5.22; 340/5.63; 340/5.62; 340/5.61; 340/5.21; 340/5.2; 340/5.71; 340/5.23; 340/825.69; 340/825.72

(58) Field of Classification Search ................ 340/8.22, 340/825.69, 5.23, 5.71, 5.2, 5.21, 5.61, 5.62, 340/5.63, 825.72, 5.22; 341/176
See application file for complete search history.

(56) References Cited

U.S. PATENT DOCUMENTS

| | | | | |
|---|---|---|---|---|
| 1,827,433 | A | 10/1931 | Kendall | |
| 2,703,236 | A | 3/1955 | Verdier | |
| 2,742,280 | A | 4/1956 | Wilcox | 268/59 |
| 3,590,529 | A | 7/1971 | Purdy | |
| 3,971,028 | A * | 7/1976 | Funk | 307/157 |
| 4,085,629 | A | 4/1978 | Fogarollo | 74/625 |
| 4,098,023 | A | 7/1978 | Slopa | 49/139 |
| 4,167,833 | A | 9/1979 | Farina et al. | |
| 4,191,237 | A | 3/1980 | Voege | |
| 4,355,309 | A | 10/1982 | Hughley et al. | 340/825.53 |
| 4,472,910 | A | 9/1984 | Iha | 49/139 |
| 4,598,238 | A | 7/1986 | Scarano | |
| 4,618,174 | A | 10/1986 | Duke | 292/135 |

(Continued)

FOREIGN PATENT DOCUMENTS

DE 88 15 823 U 4/1989

(Continued)

OTHER PUBLICATIONS

International Search Report dated Sep. 16, 2005.

*Primary Examiner*—Brian Zimmerman
*Assistant Examiner*—Vernal Brown
(74) *Attorney, Agent, or Firm*—Renner Kenner Greive Bobak Taylor & Weber

(57) ABSTRACT

An operating system for a motorized barrier includes an operator for controlling movement of the barrier between various positions. The operator may receive wireless signals from a wireless or wired wall station transmitter, a wireless keyless entry device and/or a portable remote transmitter device. The system also includes a device such as a light kit or switch that controls a load, wherein the device is capable of also receiving wireless signals to control the kit or the load. And the transmitters are capable of generating wireless signals receivable by the operator and the device for independent operation of each.

37 Claims, 3 Drawing Sheets

U.S. PATENT DOCUMENTS

| | | | | |
|---|---|---|---|---|
| 4,852,706 | A | 8/1989 | Pietrzak et al. | 192/8 |
| 4,884,831 | A | 12/1989 | Emon | 292/38 |
| 4,941,320 | A | 7/1990 | Kersten et al. | |
| 4,954,810 | A | 9/1990 | Llewellyn | |
| 4,976,168 | A | 12/1990 | Lotznicker et al. | |
| 4,993,533 | A | 2/1991 | Brown | 192/114 |
| 5,109,222 | A * | 4/1992 | Welty | 340/825.72 |
| 5,419,010 | A | 5/1995 | Mullet | 16/198 |
| 5,509,233 | A | 4/1996 | Peterson | 49/139 |
| 5,538,205 | A | 7/1996 | Bitson | |
| 5,557,887 | A | 9/1996 | Fellows et al. | |
| 5,565,855 | A | 10/1996 | Knibbe | 340/3.51 |
| 5,661,804 | A | 8/1997 | Dykema et al. | 380/274 |
| 5,698,073 | A | 12/1997 | Vincenzi | |
| 5,699,054 | A | 12/1997 | Duckworth | 340/825.22 |
| 5,699,055 | A | 12/1997 | Dykema et al. | 340/825.22 |
| 5,751,224 | A | 5/1998 | Fitzgibbon | 340/825.72 |
| 5,793,300 | A | 8/1998 | Suman et al. | 340/825.22 |
| 5,838,226 | A | 11/1998 | Houggy et al. | 340/310.01 |
| 5,854,593 | A | 12/1998 | Dykema et al. | 340/825.22 |
| 5,903,226 | A | 5/1999 | Suman et al. | 340/825.69 |
| 5,905,442 | A | 5/1999 | Mosebrook et al. | 340/3.7 |
| 5,926,106 | A | 7/1999 | Beran et al. | 340/5.61 |
| 5,931,212 | A | 8/1999 | Mullet et al. | 160/188 |
| 5,940,007 | A * | 8/1999 | Brinkmeyer et al. | 340/825.69 |
| 5,949,349 | A * | 9/1999 | Farris et al. | 340/5.26 |
| 5,963,624 | A | 10/1999 | Pope | 379/110.01 |
| 5,969,637 | A | 10/1999 | Doppelt et al. | 340/825.69 |
| 6,078,271 | A | 6/2000 | Roddy et al. | 340/825.72 |
| 6,179,036 | B1 | 1/2001 | Harvey | |
| 6,253,824 | B1 | 7/2001 | Mullet et al. | |
| 6,323,566 | B1 * | 11/2001 | Meier | 307/10.2 |
| 6,325,134 | B1 | 12/2001 | Mullet | |
| 6,334,636 | B1 * | 1/2002 | Huang et al. | 292/144 |
| 6,400,968 | B1 | 6/2002 | White et al. | 455/572 |
| 6,593,856 | B1 * | 7/2003 | Madau | 340/825.69 |
| 6,617,975 | B1 * | 9/2003 | Burgess | 340/815.47 |
| 6,880,609 | B2 | 4/2005 | Mullet et al. | 160/188 |
| 2004/0008798 | A1 * | 1/2004 | Tsui | 375/295 |
| 2004/0239496 | A1 | 12/2004 | Fitzgibbon | 340/539.1 |

FOREIGN PATENT DOCUMENTS

| | | | |
|---|---|---|---|
| DE | 93 10 534 | U | 10/1993 |
| EP | 0 939 189 | A | 9/1999 |
| WO | WO 99 07971 | A | 2/1999 |
| WO | WO 00 50720 | A | 8/2000 |
| WO | WO 01/35368 | A2 | 5/2001 |

* cited by examiner

OPERATING SYSTEM FOR A MOTORIZED BARRIER OPERATOR WITH A RADIO FREQUENCY ENERGIZED LIGHT KIT AND/OR SWITCH AND METHODS FOR PROGRAMMING THE SAME

TECHNICAL FIELD

Generally, the present invention relates to a barrier operator system for use on a closure member moveable relative to a fixed member. More particularly, the present invention relates to an operating system for controlling the operation of a movable barrier, such as a gate or door, between a closed position and an open position. More specifically, the present invention relates to an operating system that functions upon the receipt of wireless, preferably radio frequency signals, and wherein those wireless signals enable direct actuation of lights and/or a switch that controls operation of an electrical load.

BACKGROUND ART

As is well known, garage doors or gates enclose an area to allow selective ingress and egress to and from the area. Garage doors initially were moveable by hand. But due to their weight and the inconvenience of opening and closing the door, motors are now linked to the door through an operator controller. Control of such a motor may be provided by a hard-wired or wireless push button which, when actuated, relays a signal to the operator controller that starts the motor and moves the door in one direction until a predetermined limit is reached. When the button is pressed again, the motor moves the door in an opposite direction. Garage door operators are now provided with safety features which stop and reverse the door travel when an obstruction is encountered. Other safety devices, such as photoelectric sensors, detect whenever there is an obstruction within the path of the door and send a signal to the operator to take corrective action. Remote control devices are now also provided to facilitate the opening and closing of the door without having to get out of the car. The prior art also discloses various other added features for the convenience of the user.

U.S. Pat. No. 6,078,271 to Roddy, et al. discloses a programmable transmitter which includes a receiver for receiving a coded signal at a desired frequency. The code is stored in memory during a learning mode and is then retransmitted sequentially at a plurality of frequencies, including the desired frequency. During this time, the operator observes the device to be operated and indicates to the transmitter when the controlled device performs the desired function, i.e., when the desired frequency is transmitted. At that time, the user presses a button on the transmitter, and the transmitter stores the most recently transmitted frequency. This method addresses both multiple RF codes and frequencies which the need for both is redundant but necessary to cover all different manufacturers' devices. This art is only relevant for showing methods of RF communication with multiple frequencies rather that measuring amplitude of signals at the same frequency.

U.S. Pat. No. 5,926,106 to Beran et al. discloses an apparatus and related methods for entryway access control using serial discretely coded radio frequency transmissions initiated by a single user access request signal. The control apparatus is battery operated and includes a user actuatable input selectively generating a single electrical initiation signal. Circuitry provides first and second conditioned output signals responsive to receipt of the single electrical initiation signal, the output signals enabling first and second transmission channels, respectively, of an RF transmitter or transmitters. A signal delaying circuit delays output of the second conditioned output signal relative to output of the first conditioned output signal. This method of activating is deficient in that a device requires generation of two separate RF signals at timed intervals.

U.S. Pat. No. 5,751,224 to Fitzgibbon discloses a movable barrier or garage door operator that has a control head controlling an electric motor connected to a movable barrier or garage door to open and close it. The control head has an RF receiver for receiving RF signals from a hand-held transmitter or a fixed keypad transmitter. The receiver operates the electric motor upon matching a received code with a stored code. The stored codes may be updated or loaded either by enabling the learn mode of the receiver from the fixed keypad transmitter or from a wired control unit positioned within the garage. This device controls both the operator and the garage light but both are controlled through the motor control board and not separate devices so separate communication is not required. This type of arrangement—by running the light control through the operator controls—causes the light to be responsive to the operator. For example, if the garage door is either in the open or closed position and the light has been activated by the light circuit, when the operator motor is activated, the control board will take the light on function and route it to the time delay circuit and turn the light out when the timer expires leaving the user in the dark until the light circuit is again manually activated. This device uses one receiver to receive the transmitted signal and can activate either the light or the motorized operator. However the light must be wired to the control board. Therefore is the light is remote from the operator then wires must be ran to connect the light to the control board. Because of this wiring issue, all the devices that practice this invention mount the light integral with the operator housing that contains the motor control board.

U.S. Pat. No. 5,905,442 to Mosebrook, et al. discloses an apparatus for controlling an electrical device by remote control including a control device coupled to the electrical device by a wire connection for providing power to the electrical device. The control device includes an actuator for adjusting the status of the electrical device, and a radio frequency transmitter/receiver and antenna for adjusting the status of the electrical device in response to control information in a radio frequency signal. The transmitter/receiver receives the radio frequency signal via the antenna and transmits a status radio frequency signal with information regarding the status of the electrical device. A master control unit has at least one actuator and status indicator and a transmitter/receiver for transmitting a radio frequency signal having the control information therein to control the status of the electrical device and for receiving the status information from the control device. The status indicator indicates the status of the electrical device in response to the status information. A repeater receives the radio frequency signal from the master unit and transmits the control information to the control device and receives the status information from the control device and transmits it to the master unit. This device relates to the control of electrical devices, and in particular, electric lamps, from remote locations. Even more particularly, the device relates to the control of electrical devices such as electric lamps from remote locations through communication links, e.g., radio frequency links. In particular, the device relates to a system for controlling electrical devices from remote locations over, for example, radio frequency links and which dispenses with any need to alter the internal wiring of the electrical system, i.e., the internal wiring of a building. This device is flawed in that it requires providing a manual actuator at the control device for adjusting the status of the electrical device.

U.S. Pat. No. 5,565,855 to Knibbe discloses a building management system that improves the regulation and control of appliances, such as luminaries, window blinds and heating equipment in a building. The appliances are connected via a communication bus to a control system, which performs the automatic regulation and control. To avoid rewiring the bus every time that changes are made to the arrangement of the appliances and/or the lay-out of the building, transponders are mounted at regular fixed places in the building, wherein the transponders transmit bus signals wirelessly to the appliances.

U.S. Pat. No. 5,838,226 to Houggy, et al. discloses the control of electrical devices, and in particular, electric lamps from remote locations through radio frequency links. This device further relates to a system for controlling electrical devices from remote locations over communications links, e.g., radio frequency links, and which dispenses with any need to alter the internal wiring of the electrical system, i.e., the internal wiring of a building. And the device relates to a communication protocol for such a system for providing communications signals between components of the system to insure that each component reliably receives communications intended for it.

U.S. Pat. No. 5,969,637 to Doppelt, et al. discloses a garage door operator with a light control that includes a garage door movement apparatus for moving the garage door in an open and close directions within a doorway. The operator also includes a light having an on and an off state; a controller for generating a door movement signal for operating the door movement apparatus and for generating a light enable signal for operating the light in one of a plurality of on and off states; and an obstacle detector for detecting the presence of an obstruction in the doorway. The controller responds to the door state (traveling open, traveling closed and stopped open) in order to control operation of the door and activation of the lights. When the door state indicates the door is stopped open and the obstacle detector detects an obstruction in the doorway, the controller generates a light enable signal for enabling the light. This device requires a signal from a RF transmitter or a hard wired remote switch to the controller which then activates either the operator or the light, or both.

U.S. Pat. No. 5,793,300 to Suman, et al. discloses a control system that selectively controls the operation of at least one lamp and at least one garage door opener. The control system includes a control module which includes connectors adapted to be coupled to at least one lamp through household AC power conductors. The control module also includes terminals adapted to be connected to a garage door opener mechanism. A circuit positioned in the control module receives and identifies radio frequency signals, stores control information associated with a plurality of received signals from a remote control in a training mode and outputs control signals for communication over the AC power line and the garage door mechanism in accordance with the stored control signals when one of said remote control signals is received in an operating mode. The control module also includes a selector used to select garage door and/or light control operations to be associated with a signal received by the control module in a training mode. In this disclosure, the RF signal goes to a control module and then to the light or the operator.

In some of the prior art listed above, the control module for the lights is the same module for the operator so if there is a problem with one circuit, it could affect both units. Further, discreet signals are required for the control module to differentiate the command for the lights versus the command for the door. Further still, the lamp is normally activated to illuminate when the door operate command is issued and as mentioned above, once the activation occurs whether previously illuminated or not, the control module would switch the light command to the time delay circuit and shut off the light after a predetermined period of time. This necessitates a manual activation of the light after the control circuit times out. Accordingly, there is need in the art for more flexibility in controlling lights in proximity to the enclosed area associated with the barrier. There is also a need for the ability to control movements of the barrier and an electrical "load"—such as an appliance—with the same device.

DISCLOSURE OF INVENTION

In general, the present invention contemplates an operating system for a motorized barrier operator with a radio frequency energized light kit and/or switch and methods for programming the same.

The present invention also contemplates an operator system for a motorized barrier, comprising an operator which controls a motorized barrier, the operator capable of receiving wireless signals to control the motorized barrier; a device which controls an electrical load, the device capable of receiving wireless signals to control the load; and at least one transmitter capable of generating wireless signals receivable by the operator and the device for independent operation of each.

And the invention contemplates an operator system for a motorized barrier, comprising an operator which controls the motorized barrier, the operator capable of receiving wireless signals to control the motorized barrier, and the operator capable of generating wireless signals; at least one transmitter capable of generating wireless signals; and a device which controls an electrical load, the device capable of receiving wireless signals generated by at least one of the operator and the at least one transmitter to enable operation of the device.

The present invention further contemplates a system for controlling electrical loads, comprising at least one device which controls an electrical load the device capable of receiving wireless signals to control the load; and at least one transmitter having at least one function button, wherein actuation of the at least one function button generates a wireless signal receivable by the at least one device.

BRIEF DESCRIPTION OF THE DRAWINGS

For a complete understanding of the objects, techniques and structure of the invention, reference should be made to the following detailed description and accompanying drawings, wherein.

PREFERRED EMBODIMENT FOR CARRYING OUT THE INVENTION

Figure 1:
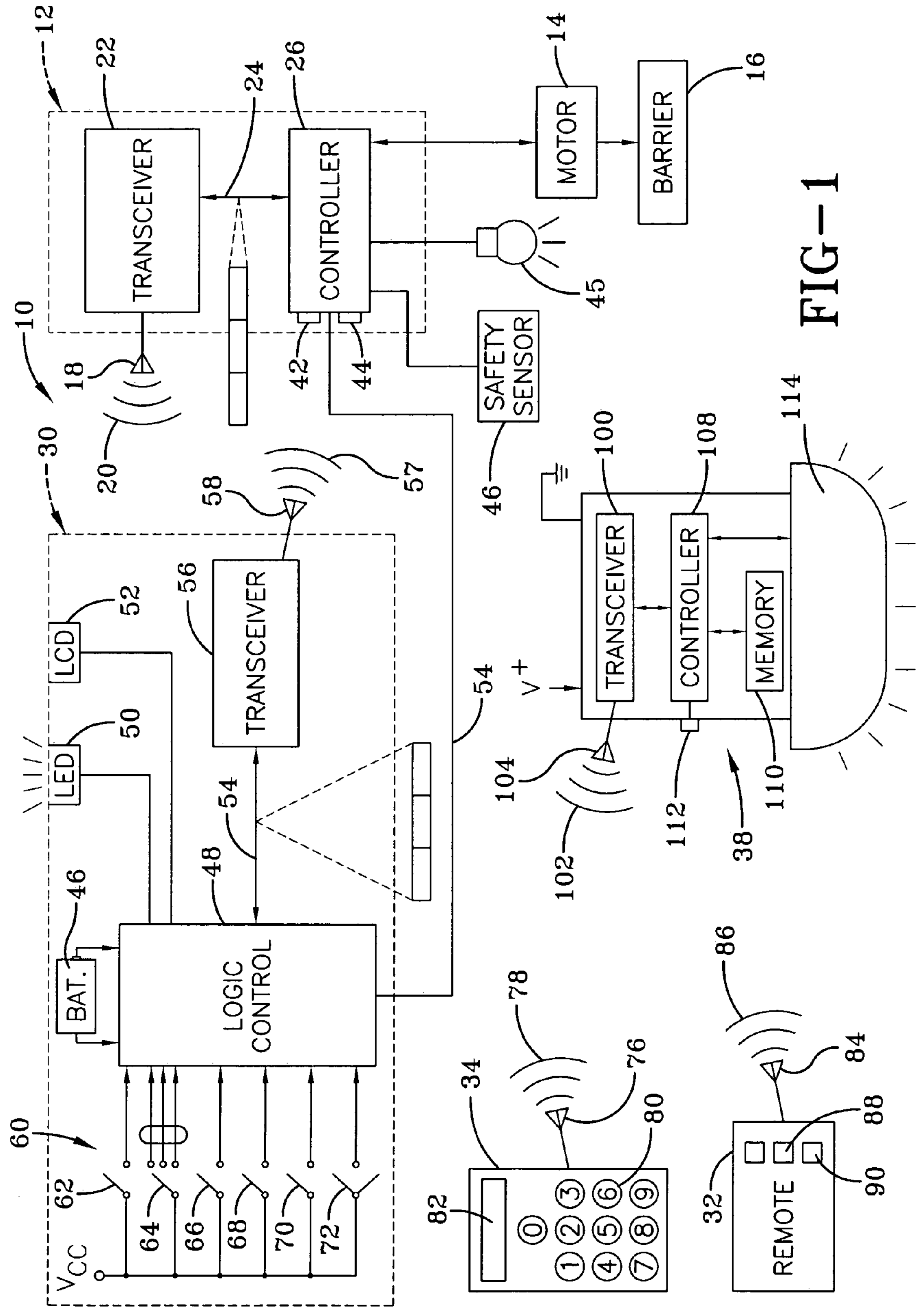
FIG. 1 is an operational system for a motorized barrier operator according to one embodiment of the present invention.

An operating system for a motorized door or gate operator according to the concepts of the present invention, depicted in FIG. 1 of the drawings, is generally indicated by the numeral 10. The system 10 may be employed in conjunction with a wide variety of movable barrier doors or gates, wherein the doors are of the type utilized in garages, commercial and utility buildings, and other structures, as well as windows or other closure members, all of which may be linear, curved, or otherwise non-linear, in whole or in part. Such barriers or other members are commonly constructed of a variety of materials such as wood, metal, various plastics, or combinations thereof. The lower extremity of doors or other member of these various types may be substantially rectangular or may be profiled in any number of ways for the positioning of reinforcing members or other purposes. In the preferred use, the present invention is utilized with residential-type garage doors.

As is well known, operating systems used for moving the barrier may take many forms. The most common operating systems include an operator 12 that controls operation of a motor 14 which is linked by any number of mechanisms such as gears, springs, cables and the like to a barrier 16. The operator and the motor may be placed in any number of positions with respect to the barrier and the operator/motor combination may be referred to in the art as header-mounted, trolley, jackshaft, screwdrive, wormdrive and so on. Upon receiving an operational command, the operator energizes the motor, which in turn moves the associated mechanisms connected to the barrier for movement thereof. The edges of the barrier are typically slidably retained and/or supported within rails or tracks.

The operator 12 includes an antenna 18 for receiving or sending a radio frequency (RF) signal or any other type of signal associated with other components within the system. The radio frequency signal 20 is transferred to or received from a transceiver 22 which converts the radio frequency signal into a code signal 24 that is received by a controller 26. Alternatively, the controller 26 may receive the data signal, which is representative of the RF signal, directly by a wire. The controller 26 provides the necessary hardware, software and memory for use of the operator 12.

Figure 2:
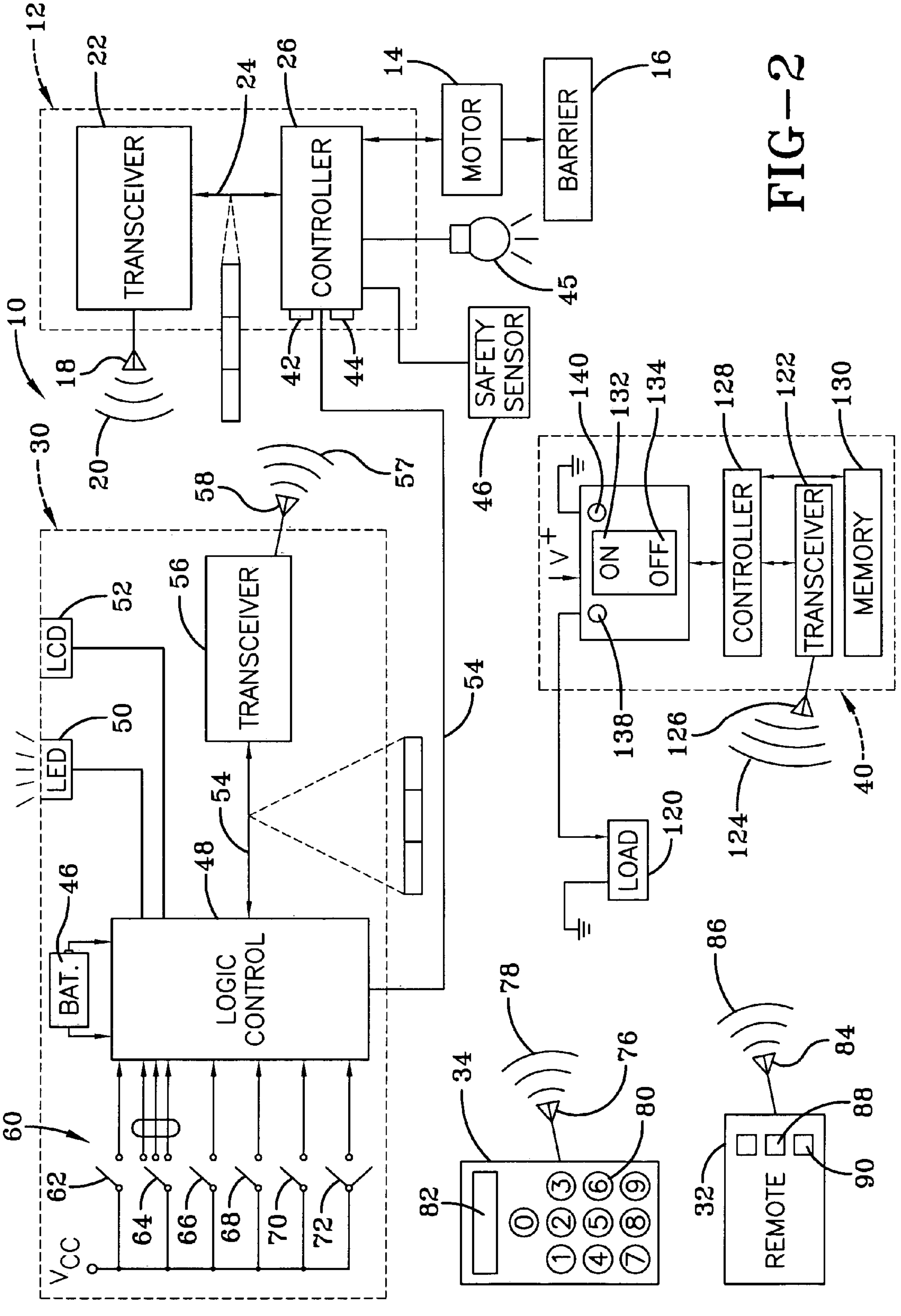
FIG. 2 is an operational system for a motorized barrier operator according to another embodiment of the present invention.

As will be discussed in greater detail below, the controller 26 receives and sends signals primarily for the movement of the barrier but also for implementing safety features and functional enhancements that facilitate use of the system. For the embodiments disclosed herein, the controller primarily receives operational commands from transmitters identified as a wall station transmitter 30, a remote or portable transmitter 32, or a keyless transmitter 34. These transmitters and the controller may also communicate with a light kit, designated generally by the numeral 38 as shown in FIG. 1, and/or a load switch, designated generally by the numeral 40 as shown in FIG. 2. The transceiver 22 and the controller 26 may be configured to emit and/or receive one or more than one range of RF signals. Likewise, the transmitters 30, 32, and 34 may be configured to emit and/or receive more than one range of RF signals. In particular, the controller may be capable of receiving one range of RF signals and then subsequently generating another range of RF signals. The remaining details of the operator 12 will be discussed first followed by a review of the various transmitters. After this, the elements of the kit 38 and the switch 40 will be reviewed including their operational details and programming thereof.

Associated with the controller 26 may be a LED program light 42 which indicates the operational status of the controller. The controller 26 is coupled to the motor 14, which through various drive mechanisms, is coupled to the barrier 16. A secondary light 45 may be directly wired to the controller 26 for the purpose of illuminating the area enclosed by the barrier. A program button 44 is connected to the controller 26 for the purpose of allowing programming or learning of the wireless devices such as the wall station, remote and keyless transmitters; the light kit; the light switch; and the like to the operator 12. And a safety sensor 46 may be connected to the controller 26. The sensor 46 may be a photoelectric safety sensor, a door edge sensor or any other sensor that detects application of an excessive force by the moving barrier or the presence of an object in the barrier's path in either one or both directions.

The wall station transmitter 30 is typically placed near a door that enters the garage from the interior of the house and is preferably positioned at a convenient height of about five feet from the floor. The wall station 30 includes a housing typically made of polymeric material, wherein at least a portion of the housing is removable to allow access to the internal workings thereof when needed. The wall station 30 includes a battery compartment for receiving a power supply 46 which is preferably two AAA batteries. The power supply is used to provide electrical power to various components contained within the wall station as will become apparent as the description proceeds. It will be appreciated that power could be received from a residential power source or equivalent if desired. If such is the case then appropriate transformers will be needed to power the internal components. In any event, use of the dry cell batteries provide the necessary power and allow for the wall station 30 to be placed anywhere within communication range of the operator and other components and eliminates the need for obtaining power directly from the operator or other source. One component that is connected to the power supply is a logic control 48 which is a microprocessor based circuit that provides the necessary hardware, software and memory for implementing the functions to be described. An LED 50 is connected to the logic control and receives power from the power supply in a manner well known in the art. Also connected to the logic control 48 may be a liquid crystal display 52 or other low-power display for providing operational information related to the wall station and/or other components of the operating system 10. The logic control 48 generates various signals 54 which are received by a transceiver 56 for conversion to a radio frequency signal 57 (RF) that is emitted by an antenna 58. Of course other wireless types of signals, such as infrared or acoustic, could be generated by the transceiver 56 if desired. In any event, it will be appreciated that in the preferred embodiment the wall station 30 is a wireless device; however, if the need arises a wire could be used to directly transmit the signal 54 to the controller 26. As used herein, the term transceiver indicates that the device can both transmit and receive wireless signals. It is likely, however; that an identified transceiver will primarily perform one of the transmit and receive functions.

The wall station transmitter 30 includes a plurality of input switches or buttons designated generally by the numeral 60. These input switches, when actuated, allow the user to control various features of the operating system. The switches include an up/down switch 62; a 3-way selection switch 64, which provides the modes of manual close, auto-close, and radio frequency blocking; an install switch 66; a delay close switch 68; a pet height switch 70; and a light on/off switch 72. The up/down switch 62 is actuated whenever the user wants to move the barrier from an up condition to a down condition or vice versa. The 3-way selection switch 64 provides for different operational modes. Briefly, the manual close mode allows the operating system 10 to operate in much the same manner as would a normal operating system inasmuch as user input is required to open and close the movable barrier. The auto-close feature allows for the movable barrier to close if left in a fully open position for a predetermined period of time and provided that other conditions are met. The radio frequency blocking feature is for when a user is on vacation and desires that no external or remote transmitters allow for operation of the movable barrier. The install switch 66 provides for an installation routine to set the operational limits of the movable barrier with respect to the other physical parameters of the movable barrier. In other words, barrier travel limits and force profiles are generated during the actuation of the install routine. The delay close switch 68 allows for a user to exit the enclosed area within a predetermined period of time without inadvertently actuating safety features such as photoelectric eyes and the like. The pet height switch 70 allows for the door to be moved to a minimal open position of anywhere from 4 to 12 inches to allow the ingress and egress of small pets. The light switch 72 may be activated in either of two directions and turns the light 38 associated with the operating system 10 on and off. The switch 72 may also control the light 45.

Another of the transmitters that may be associated with the operator 12 is the keyless external transmitter designated generally by the numeral 34. The keyless transmitter 34 provides an antenna 76 for transmitting and, if needed, receiving signals 78 to and from the operator 12. The keyless transmitter 76 includes a keypad 80 which allows for the user to enter a predetermined identification number or code to initiate movement of the barrier. A liquid crystal display 82 may be associated with the keyless transmitter if desired. Upon completion of the entry of the identification number a radio frequency signal 78 is emitted by the antenna.

Another type of transmitter is the remote transmitter 32 which provides an antenna 84 which emits a radio frequency signal 86. It will be appreciated that the remote transmitter 32 may include its own controller for the purpose of generating the appropriate radio frequency signal. Fixed code or rolling code technology may be used for communication of all the transmitters with respect to the operating system 12. The remote transmitter may include a main function button 88 and a plurality of auxiliary function buttons 90 that independently control other features associated with the operating system. In particular, actuation of one of the buttons may be used solely for control of the barrier while another of the buttons may independently control the light 38 associated with the operating system or other related features. Usually, the main function button initiates barrier movement and energization of the kit 38 or switch 40.

As best seen in FIG. 1, the light kit 38 is associated with the operating system 10. Generally, the light kit is provided for the convenience of the user and the installer inasmuch as the light kit is connectable to any standard duplex electrical outlet and does not need to be provided with power from the operator 12. The light kit 38 may be used in conjunction with or in the alternative to the light 45 which is connected directly to the controller 36. The light kit 38 may be mounted to a ceiling outlet, a wall outlet or to any residential power outlet. The light kit is energized by a radio frequency signal and as such placement of the light kit is limited only by the range of the RF signal which it is programmed to receive. The kit operates around a frequency of about 433 MHz at 25° C. Of course other frequencies could be used as permitted by regulatory agencies. The frequency may be set by a resonator or crystal in the factory so that no end-user adjustment can be made.

The light kit 38 includes a transceiver 100 which is capable of receiving a radio frequency signal 102 via an antenna 104. Any received or emitted signals passing through the transceiver are directed to or generated by a kit controller 108 which may be provided with an external or internal memory device 110. It will be appreciated that the controller 108 includes all the necessary hardware, software and memory for incorporating the light kit into the operating system 10. A program button 112 is connected to the controller 108 and allows for learning of different transmitters and/or the operator 12 so as to enable operation of the light kit. And the light kit 38 includes a light element 114 which is powered by the residential power as needed.

Briefly, the light kit 38 is programmable to be associated with the operator 12 and/or the transmitters 30, 32 and 34. In view of the similarities in the programming and use of the light kit 38 with the switch load 40, a discussion of the programming and use of these devices follow after a component description of the switch load.

Referring now to FIG. 2, it can be seen that the switch is designated generally by the numeral 40. The switch 40 controls operation of a load 120 which may be a light fixture, a bank of lights or any electrical appliance which is wired to the switch. It will be further appreciated that the switch 40 may be used simultaneously with the light kit 38 or may be used separately. In any event, the switch 40 includes a transceiver 122 which receives and/or generates a radio frequency signal 124. In the preferred embodiments, the switch operates at a different frequency range than the wall station transmitter 30, the keyless external transmitter 34, and the remote transmitter 32. In the preferred embodiment, the RF switch 40 operates around a frequency of about 433 MHz at 25° C. As with the light kit, the frequency may be factory-set by a resonator or crystal with user adjustable control. The light switch's data reception range is preferably 100 feet minimum in open air and in the line of sight of the receiving or transmitting device when oriented for ideal reception in a vertical position and mounted in a plastic housing that is fastened to an appropriate wall or surface. In any event, a signal 124 is transmitted and/or received by an antenna 126. The received or transmitted signal is routed to a switch controller 128 which compares the signal to codes previously stored in a memory device 130. It will be appreciated that the memory device may be external or incorporated internally within the controller 128. It will further be appreciated that the controller contains the necessary hardware, software and memory for implementing the features discussed herein. The switch 40 includes an on button 132 and an off button 134 which allows for direct control of the load if desired. Status lights 138 and 140 may be employed to indicate the status of the switch which can then be compared to the operational state of the load. In the preferred embodiment, the light 138 is a green LED and the other light 140 is a red LED. The switch is operable from 120V AC, 60 Hz, signal-phase power (hot and neutral). A third wire is provided as an output to supply power to the load 120. It is envisioned that the operating current is approximately 6-8 mA with the load 120 activated and 2-3 mA with the load off. This operating current does not include the switched load. It is envisioned that the switch will not have a user-replaceable fuse and that it will likely incorporate an inherently limited transformer for protection in the case of a power supply failure.

Figure 3:
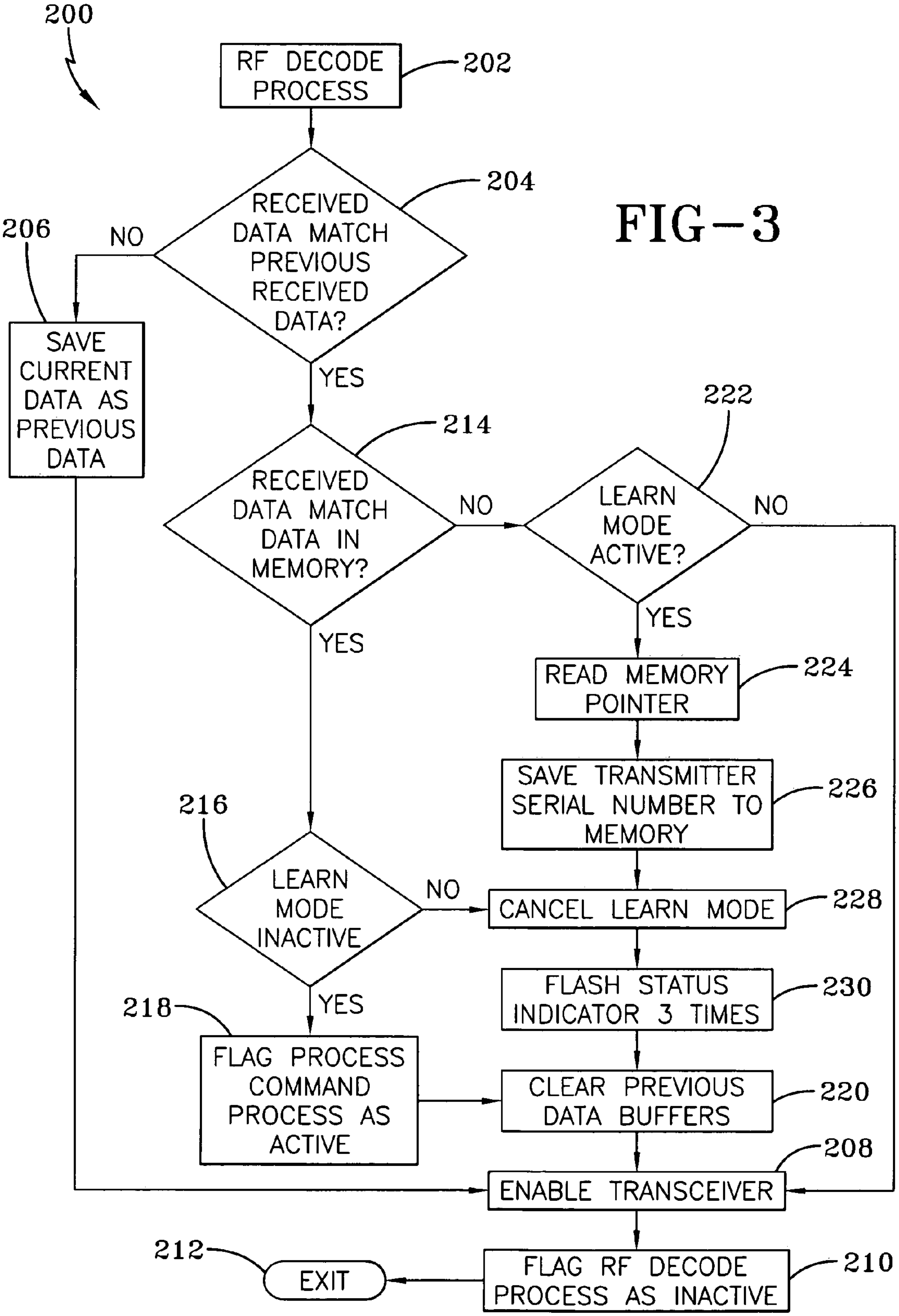
FIG. 3 is an operational flowchart setting out the operational steps for teaching a radio frequency energized switch and light kit for use with the operational system.

It will be appreciated that the procedures for decoding RF signals and learning either the light kit 38 and the switch for use in the system 10 are somewhat similar. Accordingly, referring now to FIG. 3, an operational procedure for primarily decoding RF signals and teaching the light kit or switch is designated generally by the numeral 200. Specific features of the learning processes of the kit and switch are discussed separately. At a first step 202 a radio frequency decode process is initiated. Next, at step 204 the devices, which collectively mean the switch and/or the kit, receive data from the transmitters and/or the operator and inquire as to whether the data received matches previously received data. If the data does not match then at step 206 the current data is saved as "previous data" and the respective transceiver 100/122 is enabled at step 208. Subsequently, at step 210, the radio frequency decode process is rendered inactive and the teaching subroutine is exited at step 212.

Returning now to step 204 if it is determined that the received data matches previously received data, in other words, a valid or operational signal has been received then at step 214, the controllers determine whether the received data matches any data received in the corresponding memory devices. If a match is found then the controllers determine whether the learn mode is inactive or not at step 216. If the learn mode is inactive then the process proceeds to step 218 and the process command is flagged as active. Subsequently at step 220 the previous data buffers are cleared and the transceivers are enabled at step 208 as previously discussed. The process then continues on with steps 210 and 212.

If at step 214 it is determined that the received data does not match any of the data stored in memory, then the process proceeds to step 222 to determine whether the learn mode is active or not at step 222. Typically, the learn mode is entered for the particular devices by pressing and holding the program button 112 or the on switch 132 for a predetermined period of time. If at step 222 the learn mode is not placed in an active mode then the process proceeds to step 208 and continues on as previously discussed. If, however, at step 222 it is determined that a learn mode has been properly entered, then at step 224 the controllers read the memory pointer to determine the next available memory location. When a memory location is open then at step 226 the transmitter serial number to be associated with the kit or switch is stored. Following this, at step 228 the learn mode is cancelled and an appropriate indicator is generated at step 230. This typically includes flashing of the light element or one of the light indicators 138 and/or 140 a predetermined number of times. Or an audible sound could be generated by one of the devices. Upon completion of this step 230 then the process continues on to step 220 and the remaining process steps are performed. It is noted that if at step 216 a learn mode is determined to be inactive then the learn mode is cancelled at step 228 and the aforementioned process steps 228, 230, 220, 208, 210 and 212 are executed.

The light kit 38 will preferably be used with a garage door operating system 10. However, it will be appreciated that the light kit may be operated separately as long as it is supplied with an appropriate transmitter device that can be learned to the controller 108. The data transmission range of the light kit is preferably 500 feet minimum in open air and in the line of sight of the device when tested with a compatible companion transmitting unit operating in either a rolling code or fixed code format. If a rolling code format is utilized the controller will be able to properly decode the fixed portion of the rolling code at a "one out of two" transmission data rate. It is envisioned that the kit will be shipped to the consumer with all transmitter codes erased from the memory 110. When initially powered up, after a power failure and when power is restored, the kit is programmed to turn the lighting element 114 on for a period of approximately one second and then turn the lighting element off. Once this power up process is complete the kit will operate in its intended normal mode.

The procedure 200 is implemented to associate a transmitter and/or operator device with the kit 38. Specifically, once the learn button 112 is released, the controller 100 turns the lighting element 114 on and off in a predetermined sequence to indicate that the learn mode has been entered. After flashing, the element remains on for a predetermined period of time and the controller will turn the element off once a valid transmission device is learned. During the learn process, if a valid code signal is received by actuating the button on the transmitter or operator to be associated with the device, then the controller compares the incoming code signal to all codes stored in the memory device 110. The controller then acts depending upon whether the code is for a new device or a previously learned device. If the code is from any previously learned button on any of the transmitters described herein then the unit will flash the lamp off and on a predetermined number of times, turn the lamp off and then immediately leave the learn routine. The controller will not update any of the user memory areas other than to update the expected next valid transmission data for that particular transmitter.

If a new device is learned to be associated with the kit 38, then the controller 108 distinguishes whether it is a portable or remote transmitter 32, a wall station transmitter 30, the operator transceiver 22 or an externally mounted or keyless entry transmitter 34. In the event the device is a portable transmitter 32 and this is the first actuation of any button from that particular transmitter the controller automatically assumes that it is to be a "door command" light routine. In other words, any actuation of this particular button on the transmitter is automatically presumed to be an up/down command for the operator 12 wherein the remote transmitter is separately or simultaneously learned to the operator, and the light kit will be turned on and off in conjunction with emission of an up/down command from the transmitter 32. The kit 38 stores the transmitter's information in nonvolatile memory and will flash the lighting element off and on a predetermined number of times for a predetermined duration to signify proper learning of the transmitter. The controller then turns the lamp off immediately and exits the learn routine. If a second button of the remote transmitter is to be associated with the kit 38 from a previous valid transmission device, the controller 10 automatically assumes that this newly learned second button is to be a "work light command." Once the second button is learned, the controller 108 flashes the light element 114 off and on a predetermined number of times, turns the lamp off and then immediately exits the learn routine. This allows for a transmitter to operate the light kit separate and apart from operation of the operator associated with the barrier. In other words, actuation of the secondary button on the remote transmitter will allow for a light to be turned on and off without having to move the barrier. And operation of the light will not be controlled by a timer.

Learning of the wall station transmitter 30 is implemented in much the same manner as the remote transmitter and the wall station 30 is considered a valid transmission device for a designated button on the wall station. In other words, an up/down button, a delay close an auto close button, or any button that emits a radio frequency signal while the light kit 38 is placed in a learn mode can be associated to initiate actuation of the light kit. For example, if the pet height button 70 is actuated while the light kit is in a learn mode, then any time that button is pressed the light element will be turned on.

The externally mounted keypad or keyless remote transmitter 34 is learned in the same manner as a valid first button learned of a remote transmitter such as for a "door command." No "work light command" mode is available for the transmitter 34 in the preferred embodiment, although actuation of select keys in a particular mode may be permitted to enable a work light mode if desired.

If the light kit 38 receives no valid transmission within approximately 25 seconds or other defined period of time after pushing and releasing the program button 112, the element 114 turns off and the controller 108 immediately exits the learn routine.

In normal operation of the light kit device it will be appreciated that any valid "door command" causes the light kit to turn the light element 114 on for a period of approximately five minutes or whatever period is deemed appropriate at the factory. Upon expiration of this time period the light element is turned off. If there has been a previously issued "work light command," then the device shall re-initialize the timer accordingly. If another valid door command is received prior to expiration of the timer, then the timer is reset and the time-out process is started over. Valid door command signals are presently limited to valid first buttons learned from remote transmitters which include remote transmitters 32 and keyless transmitters 34. Door up/down, timed door commands, pet door commands, and profile commands are preferably considered valid door commands. Any other door commands such as the auto-close switch 64 are not considered to be appropriate for activating the light kit 38.

If a work light command is received from either the remote transmitter or the wall station transmitter, the unit shall turn the element 114 on if it is off. If the element is already on, the unit will turn the lamp off only if no valid door command has been issued in the previous 30 seconds. If the controller 108 had previously received a "work light command," then the controller 108 extinguishes the element 114.

In the preferred embodiment, the light kit controller 108 has the ability to learn a total of twelve unique transmission devices. Specifically, the controller 108 may learn up to six transmitters (up to two buttons per transmitter), three wall stations and three externally mounted keyless transmitters. It is envisioned that the light kit 38 will have enough storage capability to decode and properly act upon a maximum of thirty unique buttons (three wall station transmitters, three keypad transmitters and six remote transmitters that have taught the wall station two buttons from each transmitter). The controller 108 and the memory 110 are configured to store information on a first in, first out method. Once the data storage limit for transmission codes has been reached, the removal of a first learned transmission device occurs as follows. Learning of a new transmitter only removes a previously learned transmitter, not a previously learned wall station or keyless transmitter. Learning a new wall station transmitter 30 only removes a previously learned wall station not a previously learned remote or keyless transmitter. Learning a new keyless transmitter only removes a previously learned keyless entry transmitter, not a wall station or a remote transmitter.

In summary, control of the light kit 38 may be achieved through a "same transmitter scheme." This scheme utilizes the same primary button actuation of a transmitter—wall station, remote or keyless—to move the barrier (usually an open movement) and activate the light element. And this scheme allows actuation of a secondary button on any of the transmitters to independently control the on/off state of the light. The controller associated with the kit preferably requires the use of the same frequency as used by the operator 12. If desired, the "same transmitter scheme" may be used in operation of the switch 40.

Should the user desire to clear all leaned codes from the memory 110, the learn button 112 is held down continuously for a predetermined period such as 10 seconds. Once this time has been completed, all learned devices are cleared from memory and the element 114 is flashed off and on for 10 flashing cycles. The light element 114 is then turned off and the controller 108 exits the memory clearing routine.

Based upon the foregoing, the advantages of the light kit utilized with the operating system 10 are readily apparent. It will be appreciated that the light kit 38 has its own transceiver and can receive and learn a plurality of radio frequency signals that are also receivable by an operator system utilized for controlling barrier movement. The controller 108 can activate one light or a series of lights if so connected. The light kit 38 is advantageous inasmuch as it can be operated remotely and separately apart from the operator that controls door movement. It will further be appreciated that the kit 38 can be turned on and off with the operator in a running or idle state. In other words, after the light element 114 associated with the operator has timed out, the light element 114 can be turned on again remotely without the need for opening and closing the barrier again. These features are advantageous in that a communication protocol is not required for this system and as such each component of the system may reliably receive communications intended for it. This system does not require providing a manual actuator at the control device for adjusting the status of the element 114 nor does the system require two separate radio frequency signals at timed intervals as s method of activating the device as is sometime found in prior art. Nor are multiple frequencies required for operation of the kit.

Referring back to FIG. 2, a brief summary of the learning of the switch 40 with respect to the transmitters and the operator will be discussed along with operation thereof. As noted previously, the switch is receptive or operative with a preferred radio frequency of around 433 MHz. It will further be appreciated that the transceiver 122 is capable of receiving fixed codes or rolling codes which may emanate from the operator transceiver 22 or from the transmitters 30, 32 and 34.

In the preferred embodiment, the switch 40 is initially provided to a user with all transmitter codes erased from the non-volatile memory 130. As with the light kit, in the event of a power outage, the switch 40 reads the previous stored operating state of the switch that was written into the memory 130. If the switch 40 was in an off condition when power was interrupted then the switch shall remain off when power is returned. If the switch 40 was in an on position when the power was interrupted, the switch is turned back on, unless the controller was in a timer mode in which the case the timer is reset and the load is turned off. In other words, if the load 120 was placed in an on condition by actuation of the on button 132, then the load remains on when power is returned. However, if the load 120 was turned on by virtue of a radio frequency command, then it will be turned off upon return of power to the unit. After initial power-up, the switch operates in its intended normal mode of operation. If desired, the switch can be selectively provided without the timer feature.

In order to place the switch 40 in a learn mode for the purpose of learning one or more operator serial numbers thereto, the end-user presses the off button 134 continuously for a minimum of 5 seconds, but for not more than 15 seconds. As will be appreciated these time periods may be adjusted as deemed appropriate. Once the off button has been pressed for a minimum of 5 seconds, the controller 128 illuminates the green LED 138 and activates a timer, maintained by the controller 128 that turns on the load 120 for predetermined period of time, preferably 5 minutes. Once the off switch position is released, the red LED 140 flashes continuously at a predetermined rate and the controller enters the learn mode. If the user happens to release the off switch 134 (from the initial "off" switch depression), and then presses it again during any point of the learn routine, the unit exits the learn routine, resumes normal operation and turns the load off. While in the learn routine, the switch 40 decodes all incoming radio frequency signals and if a valid signal with an appropriate serial number is received, then the switch compares this incoming serial number to all serial numbers stored in the memory device 130. If the received code is acceptable then the learning process continues storing the garage door radio frequency transmission—serial number—in non-volatile memory and flashes the green LED 138 a predetermined number of times to signal proper learning of the transmitter followed immediately by exiting of the learn routine. Accordingly, while the switch 40 is in the learn mode the appropriate button on any of the transmitters 30, 34, 32 and including the button 44 associated with the controller 26 allows that particular unit to actuate the switch 40. If the switch receives no valid transmission after approximately thirty seconds in the learn mode then the switch immediately exits the learn routine and resumes normal operation. The switch load 120 remains on for the remainder of the five minute period and any existing codes stored in the memory 130 are retained.

In a "relay signal scheme" configuration of the system 10, the switch controller 128 may receive on/off commands from the controller 26 via the transceiver 22 in response to commands received by the transceiver 22 from any one of the transmitters 30, 32 and 34. In such a scheme, it is likely that the operator 12 receives signals from the transmitters in one frequency range and generates signals to the switch controller in another frequency range. This may be done to prevent the switch from receiving interfering signals from nearby sources or so that the switch is compatible with other types of transmitter devices. Of course, the same frequency signal could be received by the transceiver 22, which in turn transmits a same frequency signal to the controller 128. If desired, "the relay signal scheme" may be used in operation of the kit 38. Indeed, it is preferred that the kit and the switch utilize the relay signal scheme.

In order to clear one or more learned serial numbers from the memory 130, the end-user presses the off position 134 on the switch continuously for a minimum of fifteen seconds. Once the off position has been pressed for a minimum of five seconds, the controller illuminates the green LED after five seconds and activates a five minute timer during which the load is turned on for a period of five minutes. If the off switch 134 continues to be pressed for a minimum of ten seconds passed the initial five seconds—for a total of fifteen seconds—then the controller 128 clears all stored serial numbers and continuously flashes the red LED 140 a predetermined number of times.

In normal operation mode, the switch 40 receives and detects a valid radio transmission command it performs as follows. The switch is programmed such that it is responsive to any valid garage door opener transmission commands including a light on command, a light off command, and a toggle command from an existing state command. A valid "light on" door opener transmission command causes the light switch to turn the load on for a period of approximately five minutes, after which time the switch turns the load off. If there had been a previously issued "load on" command then the controller 128 re-initializes the five minute timer. A valid "load off" garage door opener transmission command causes the switch to turn off the load and clear the timer accordingly. A valid "toggle" garage door opener transmission command causes the switch to toggle the load output to a state opposite of its existing state and clear the five minute timer.

The LEDs 138 and 140 provide an operational status indication during programming and use. It will be appreciated that the status indicators are preferably visible from a distant of six feet in a brightly-lit garage. And the observation point is preferably two feet above the height of the indicators. The controller 128 illuminates the red LED 140 while the load is off and illuminates the green LED 138 while the load is on. If the green LED 138 is on while the load appears to be off, then this is an indication to the user that some component of the load requires replacement. In other words, the green LED 138 indicates that the load 120 is switched on but that the load is apparently defective. The switch 40 is also advantageous in providing an on/off toggle at its source. In other words, actuation of the on position button 132 turns the load on that was off, and turns off the radio frequency receive mode of the controller. Accordingly, any signals received from the transmitters 30, 32 and 34 during this condition are ignored. Actuation of the off position button 134 causes the load 120 to be turned off if it was previously on, and it will also enable or activate the RF receive mode of the controller 128.

The switch 40 will preferably be able to learn a code of six unique barrier opener transmissions or commands. The controller 128 stores this information on a first in, first out method and once the storage limit is reached the removal of the first learned opener serial number occurs.

The advantages of the radio frequency operated switch and associated load are readily apparent. In particular, it will be appreciated that the switch has its own transceiver and can receive and learn a plurality of radio frequency signals. The switch transceiver can activate any type of electrical load such as a light or a number of lights or any other appliance that can be powered by a residential power source. The switch 40 is a separate "stand alone" device that may be controlled by the operator if desired. It will further be appreciated that the switch controls may be turned on and off with the operator in a running condition or an idle condition, and the switch may incorporate a timer to switch the load off when initially energized by the operator. The switch is also advantageous inasmuch as it does not require a communication protocol for providing communication signals between components of the system to ensure that each component reliably receives communication intended for it. And the device does not require separate radio frequency signals at timed intervals as a method of activation nor does it require operation with multiple frequencies.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. An operator system for a motorized barrier, comprising:

a motorized barrier;

an operator which controls said motorized barrier, said operator taught to receive selected wireless operational signals to control said motorized barrier;

a device which controls an electrical load, said device taught to receive selected wireless operational signals to control said load, wherein said selected wireless operational signals are recognizable by both said operator and said device and both said operator and said device are configured to transmit said selected wireless operational signals; and at least one transmitter generating wireless operational signals upon a single button actuation receivable by both said operator and said device for at least one of independent operation of each and collective operation of both said operator and said device, wherein during collective operation said selected wireless operational signals are received at said operator for actuation of said motorized barrier and retransmitted to said device for actuation of said device, and wherein said device is configured to indicate the status of said electrical load coupled to said device.

2. The system according to claim 1, wherein said at least one transmitter is selected from a group consisting of a wall station transmitter, a remote transmitter, and a keyless entry transmitter.

3. The system according to claim 2, wherein said operator and said device both receive only the same frequency wireless signals from said at least one transmitter.

4. The system according to claim 1, wherein said device is a fixture that controls a light.

5. The system according to claim 4, wherein said fixture comprises;

a transceiver for at least receiving said wireless signals; and a controller connected to said transceiver, wherein said controller validates said wireless signal and controls said light if said wireless signal is validated.

6. The system according to claim 5, wherein said fixture further comprises:

a program button operative with said controller;

a memory device associated with said controller, and wherein actuation of said program button places said controller in a learn mode such that any valid signal received while in said learn mode is stored in said memory device.

7. The system according to claim 6, wherein said controller is able to distinguish between a group of transmitters, and wherein said at least one transmitter is selected from a group consisting of a wall station transmitter, a remote transmitter, and a keyless entry transmitter.

8. The system according to claim 7, wherein said remote transmitter has plurality of function buttons, and wherein actuation of a first button of said remote transmitter in said learn mode designates said first button as a barrier command, and wherein actuation of any other button of said remote transmitter while in said learn mode designates said other button as a work light command.

9. The system according to claim 8, wherein generation of said barrier command by said at least one transmitter is separately and directly receivable by said operator and said fixture for illumination of said light for only a predetermined period of time.

10. The system according to claim 9, wherein generation of said work light command by said at least one transmitter illuminates said light if in an off condition, and returns said light to said off condition only if no door command had been previously received within a designated time period.

11. The system according to claim 10, wherein generation of said barrier command is specifically limited to valid first buttons learned from said remote transmitters, said keyless entry transmitter, and selected buttons from said wall station transmitters.

12. The system according to claim 11, wherein said selected buttons of said wall station transmitters include an up/down button, a delay close button, a pet height button, and a door profile button.

13. The system according to claim 10, wherein generation of said barrier command while said light is illuminated as a result of receiving said work light command causes said controller to turn said light off after a predetermined period of time.

14. The system according to claim 1, wherein said device is a switch that controls a load.

15. The system according to claim 14, wherein said switch further comprises:

a transceiver for at least receiving said wireless signals; and a controller connected to said transceiver, wherein said controller validates said wireless signal and control said load if said wireless signal is validated.

16. The system according to claim 15, wherein said switch further comprises:

a program button operative with said controller;

a memory device associated with said controller, and wherein actuation of said program button places said controller in a learn mode such that any valid signal received while in said learn mode is stored in said memory device.

17. The system according to claim 16, wherein said controller is able to distinguish between said at least one transmitter, and wherein said at least one transmitter is selected from a group consisting of a wall station transmitter, a remote transmitter and a keyless entry transmitter.

18. The system according to claim 17, wherein said operator is capable of generating wireless signals and wherein said controller is able to distinguish operator wireless signals and transmitter wireless signals.

19. The system according to claim 18, wherein said switch further comprises:

an on button connected to said controller;

an off button connected to said controller;

a switch on indicator connected to said controller; and a switch off indicator connected to said controller;

a memory device associated with said controller; wherein one of said buttons function as a program button operative with said controller when actuated for a predetermined period of time to place said controller in a learn mode such that any valid signal received in said learn mode is stored in said memory device.

20. The system according to claim 19, wherein the learning of a valid transmitter wireless signal and a valid operator wireless signal by said controller initiates illumination of one of said indicators in a predetermined manner.

21. The system according to claim 20, wherein receipt of said valid wireless signal by said controller when not in said learn mode causes said switch to turn said load on if previously off.

22. The system according to claim 20, wherein receipt of said valid wireless signal by said controller when not in said learn mode causes said switch to turn said load off if previously on.

23. The system according to claim 19, wherein said switch on indicator is active when said load is active and said switch off indicator is active when said load is inactive.

24. The system according to claim 23, wherein actuation of said on button turns said load on and precludes said controller from receiving any wireless signals, and wherein actuation of said off button turns said load off and allows said controller to receive any valid wireless signals.

25. The system according to claim 1, wherein said operator and said device both receive wireless signals from said at least one transmitter having only the same frequency.

26. The system according to claim 1, wherein said at least one transmitter generates said wireless signals at a first frequency and said operator generates wireless signals at a second frequency different from said first frequency.

27. The system according to claim 26, wherein said operator generates said wireless signals at said second frequency upon receipt of said wireless signals at said first frequency.

28. The system according to claim 1, wherein said operator generates said wireless signals at a first frequency upon receipt of said wireless signals from said at least one transmitter at said first frequency.

29. The system according to claim 1, wherein said at least one device comprises:

a controller; and a program button connected to said controller, wherein actuation of said program button places said controller in a learn mode for a predetermined period of time, and wherein actuation of said at least one function button during said predetermined period of time associates said at least one function button with said device.

30. The system according to claim 29, wherein said at least one function button is associated with more than one said device.

31. The system according to claim 29, wherein said at least one device is associated with more than one said transmitter.

32. The system according to claim 29, wherein said at least one function button is associated with more than one device; and wherein said at least one device is associated with more than one said transmitter.

33. The system according to claim 29, further comprising:

a memory device associated with said controller for storing a valid signal received during said learn mode.

34. A system for controlling a motorized barrier and a device, comprising:

a barrier operator which controls the motorized barrier, said barrier operator receiving and transmitting wireless operational signals;

a device which controls an electrical load, said device receiving and transmitting wireless operational signals; and at least one transmitter generating wireless operational signals receivable by one of said barrier operator and said device for actuation thereof, wherein in one mode one of said barrier operator and said device subsequently transmits another wireless operational signal to the other of said barrier operator and said device, and wherein in another mode said barrier operator retransmits received operational signals to said device to control the actuation of both said motorized barrier and said device, wherein said device is configured to indicate the status of said electrical load coupled to said device.

35. The system of claim 34 wherein said at least one transmitter generates wireless operational signals in one frequency range receivable by one of said barrier operator and said device, wherein one of said barrier operator and said device subsequently transmits wireless operational signals in another frequency range different from said one frequency range to the other of said barrier operator and said device.

36. The system according to claim 35, wherein said device is a light fixture.

37. The system according to claim 35, wherein said device is a switch that controls a load.

* * * * *